US009320059B2

(12) United States Patent
Lee et al.

(10) Patent No.: US 9,320,059 B2
(45) Date of Patent: Apr. 19, 2016

(54) METHOD AND DEVICE FOR MANAGING TAG OF CELL IN COMMUNICATION SYSTEM

(71) Applicant: LG ELECTRONICS INC., Seoul (KR)

(72) Inventors: Sunyoung Lee, Anyang-si (KR); Sungjun Park, Anyang-si (KR); Sunghoon Jung, Anyang-si (KR); Youngdae Lee, Anyang-si (KR); Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 14/385,715

(22) PCT Filed: Mar. 14, 2013

(86) PCT No.: PCT/KR2013/002072
§ 371 (c)(1),
(2) Date: Sep. 16, 2014

(87) PCT Pub. No.: WO2013/141520
PCT Pub. Date: Sep. 26, 2013

(65) Prior Publication Data
US 2015/0071261 A1    Mar. 12, 2015

Related U.S. Application Data

(60) Provisional application No. 61/612,384, filed on Mar. 18, 2012.

(51) Int. Cl.
H04J 3/00       (2006.01)
H04W 74/08      (2009.01)
H04W 56/00      (2009.01)
H04L 5/00       (2006.01)

(52) U.S. Cl.
CPC .......... *H04W 74/0833* (2013.01); *H04L 5/003* (2013.01); *H04W 56/0005* (2013.01); *H04W 56/0045* (2013.01)

(58) Field of Classification Search
None
See application file for complete search history.

(56) References Cited

U.S. PATENT DOCUMENTS

2012/0300715 A1* 11/2012 Pelletier ............ H04W 56/0005
                                                 370/329
2013/0188580 A1*  7/2013 Dinan .................. H04W 52/281
                                                 370/329
2014/0369325 A1* 12/2014 Bergstrom ........ H04W 56/0045
                                                 370/336

FOREIGN PATENT DOCUMENTS

WO      2011/085200      7/2011
WO      2011/129601     10/2011

OTHER PUBLICATIONS

Ericsson, et al., "Timing Advance Maintenance for SCells," 3GPP TSG-RAN WG2 #77, Tdoc R2- 120483, Feb. 2012, 5 pages.
(Continued)

*Primary Examiner* — Jutai Kao
(74) *Attorney, Agent, or Firm* — Lee, Hong, Degerman, Kang & Waimey

(57) ABSTRACT

This description suggests a technique of controlling the timing advance group (TAG) of a cell. In particular, this description suggests a method of managing the TAG in a communication system. The method may include receiving a control signal indicating a cell by user equipment (UE); putting the cell in a first TAG by the UE in response to the control signal, wherein the first TAG includes only at least one secondary cell of which the uplink timing is not decided; performing a random access procedure on the cell in the first TAG by the UE; and putting the cell in a second TAG from the first TAG by the UE.

13 Claims, 12 Drawing Sheets

(56) References Cited

OTHER PUBLICATIONS

LG Electronics Inc., "Considerations for multiple timing advances in Rel-11," 3GPP TSG-RAN2 Meeting #74, R2-113254, May 2011, 3 pages.

Huawei, et al., "Discussion on TA group management," 3GPP TSG-RAN WG2 Meeting #74, R2-113285, May 2011, 5 pages.

PCT International Application No. PCT/KR2013/002072, Written Opinion of the International Searching Authority dated Jun. 19, 2013, 1 page.

* cited by examiner

FIG. 7

| $C_7$ | $C_6$ | $C_5$ | $C_4$ | $C_3$ | $C_2$ | $C_1$ | R | Oct 1

METHOD AND DEVICE FOR MANAGING TAG OF CELL IN COMMUNICATION SYSTEM

CROSS-REFERENCE TO RELATED APPLICATIONS

This application is the National Stage filing under 35 U.S.C. 371 of International Application No. PCT/KR2013/002072, filed on Mar. 14, 2013, which claims the benefit of U.S. Provisional Application Ser. No. 61/612,384, filed on Mar. 18, 2012, the contents of which are hereby incorporated by reference herein in their entirety.

BACKGROUND OF THE INVENTION

1. Field of the Invention

The present invention relates to a technique for managing timing advanced group (TAG) of a cell, and more particularly, to a method and apparatus for suggesting a new type of TAG and managing time synchronization of the cell using the TAG.

2. Related Art

One of the requirements in wireless communication systems is to support high data transmission rate. For this, various technologies have been researched such as multiple input multiple output (MIMO), cooperative multiple point transmission (CoMP), relay, carrier aggregation, and so on.

The carrier aggregation (CA) is a concept that multiple bands are combined into one system. In this case, each band that is available to be operated independently may be called component carrier (CC). The multiple carriers may correspond to multiple cells, and the cells may be managed with being distinguished to various sort of cells such as a primary cell and a secondary cell.

SUMMARY OF THE INVENTION

The present specification is suggested to improve a technique for controlling TAG of a cell. Particularly, for the CA technique of the LTE system that uses multiple uplink time synchronization, the present specification suggests the technique of allocating a specific sub serving cell (that is, a specific secondary cell) to new type of TAG. The new type of technique may be a temporary time synchronization group. Through this, such performances can be improved as measure uplink time synchronization of the corresponding sub serving cell, and allocates or re-allocates the sub serving cell.

The present specification provides a method of managing a timing advance group (TAG). In detail, a method of managing a TAG in a communication system is provided. The method comprises: receiving, at a user equipment (UE), control signal indicating a cell; in response to the control signal, including, at the UE, the cell in a first TAG, wherein the first TAG only includes at least one secondary cell of which uplink timing is undetermined; performing, at the UE, random access procedure on the cell included in the first TAG; and including, at the UE, the cell from the first TAG to a second TAG.

Additionally or alternatively, the first TAG is a temporary TAG.

Additionally or alternatively, the second TAG is a TAG including at least one cell of which uplink timing is determined.

Additionally or alternatively, the control signal does not include a TAG identifier (TAG-ID).

Additionally or alternatively, the control signal includes a TAG-ID.

Additionally or alternatively, the step of including the cell to the second TAG comprises: changing, at the UE, a TAG of the cell from the first TAG being a temporary TAG to the second TAG only including at least one of which uplink timing is determined.

Additionally or alternatively, a time alignment timer (TAT) is not configured for the first TAG.

Additionally or alternatively, the first TAG does not include a timing reference cell.

Additionally or alternatively, the control signal includes information on a dedicated random access preamble.

Additionally or alternatively, random access procedure is performed by using the dedicated random access preamble.

Additionally or alternatively, the method further comprises activating the cell when the cell is included in the first TAG.

Additionally or alternatively, the random access procedure is initiated by a physical downlink control channel (PDCCH) order received from a base station.

The present specification provides a user equipment (UE). The UE comprises: a transceiver configured to receive and/or transmit a signal; and a processor coupled to the transceiver and configured to: receive control signal indicating a cell; in response to the control signal, include the cell in a first TAG, wherein the first TAG only includes at least one secondary cell of which uplink timing is undetermined; perform random access procedure on the cell included in the first TAG; and include the cell from the first TAG to a second TAG.

BRIEF DESCRIPTION OF THE DRAWINGS

FIG. 7 is a block diagram illustrating a particular example of the Activation/Deactivation commands that control the activation state of the sub serving cell.

DESCRIPTION OF EXEMPLARY EMBODIMENTS

The present document provides a method and apparatus for controlling and transmitting a timer in a wireless communication system that supports carrier aggregation (CA) in wireless communication systems. The present document is described based on 3GPP LTE and its evolution that support the carrier aggregation (CA) to clarify descriptions, but not limited thereto.

Long Term Evolution (LTE) suggested by $3^{rd}$ Generation Partnership Project (3GPP) standardization organization is a part of evolved-UMTS (e-UMTS) that uses Evolved-Universal Terrestrial Radio Access Network (E-UTRAN), Orthogonal Frequency Division Multiple Access (OFDMA) is adopted in downlink and Single Carrier-Frequency Division Multiple Access (SC-FDMA) is adopted. LTE-advanced (LTE-A) is the evolution of LTE.

Figure 1:
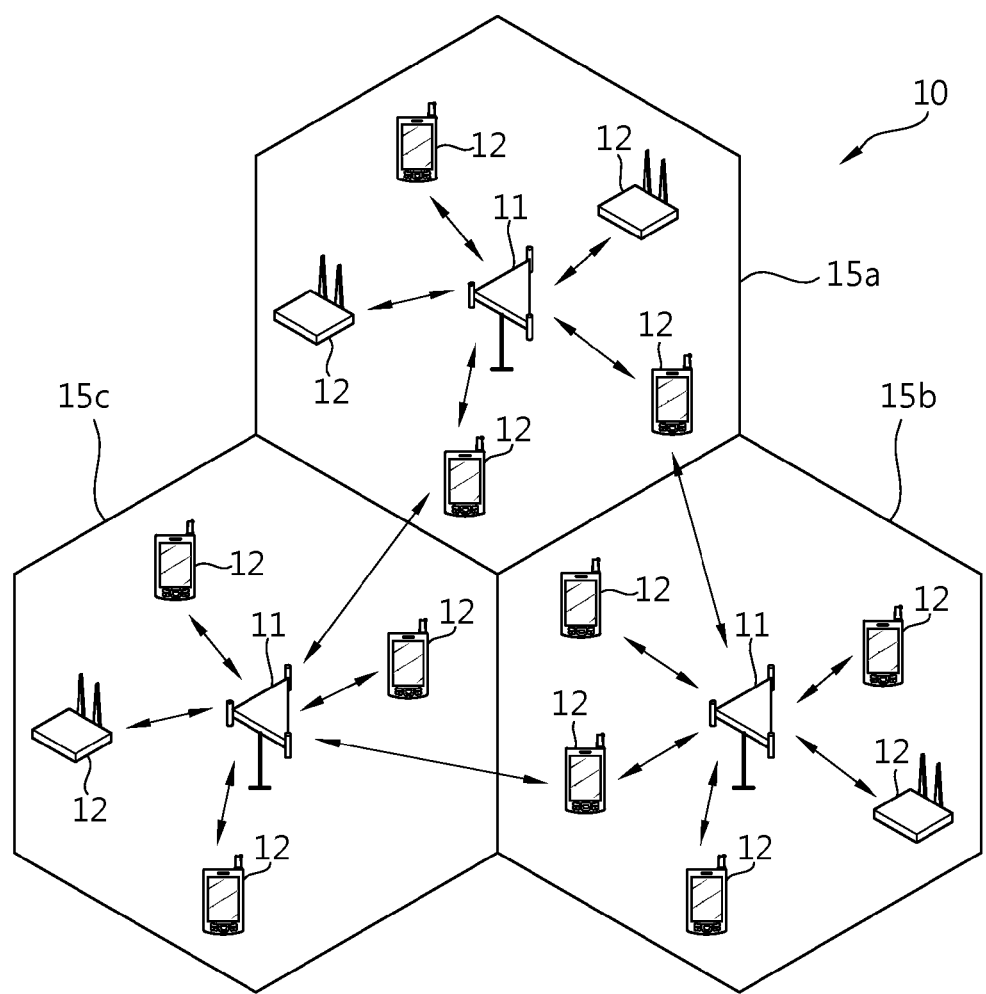
FIG. 1 shows a wireless communication system.

FIG. 1 shows a wireless communication system.

Referring to FIG. 1, the wireless communication system 10 includes at least one base station (BS) 11. Respective BSs 11 provide a communication service to particular geographical regions 15, which are generally called cells. Each cell may be divided into a plurality of regions, and respective regions are called sectors. One or more cells may be existed in a BS. Generally, the BS 11 refers to a fixed station that communicates with a user equipment 13, and may be called other terms such as an evolved NodeB (eNB), a Base Transceiver System (BTS), an Access Point (AP), an Access Network (AN), and so on.

A user equipment (UE) 12 may be fixed or mobile, and may be referred to by other names such as a Mobile Station (MS), a User Terminal (UT), a Subscriber Station (SS), a Wireless Device, a Personal Digital Assistant (PDA), a Wireless Modem, a Handheld Device, an Access Terminal (AT), and so on.

Hereinafter, downlink (DL) refers to transmission from the BS 11 to the UE 12 and uplink refers to transmission from the UE 12 to the BS 11.

The wireless communication system 10 may be a system that supports bidirectional communication. The bidirectional communication system may be performed using a Time Division Duplex (TDD) mode and a Frequency Division Duplex (FDD) mode. The TDD mode uses different time resources in UL transmission and DL transmission. The FDD mode uses different frequency resources in UL transmission and DL transmission. The BS 11 and the UE 12 communicate each other using radio resources which are called radio frames.

The system shown in FIG. 1 may be implemented by LTE system. In this case, the structure of LTE system may be divided into Evolved UMTS Terrestrial Radio Access Network (E-UTRAN) and Evolved Packet Core (EPC). The E-UTRAN is comprised of a user equipment (UE) and an Evolved NodeB (eNB), the interface between the UE and the eNB is called Uu interface, and the interface between the eNB and the other eNB is called X2 interface. The EPC may be comprised of a Mobility Management Entity (MME) that is in charge of the Control-plane function and a Serving Gateway that is in charge of the User-plane function. Meanwhile, the interface between the eNB and the MME is called S1-MME interface, the interface between the eNB and the S-GW is called S1-U interface, and these two are commonly called S1 interface.

Figure 2:
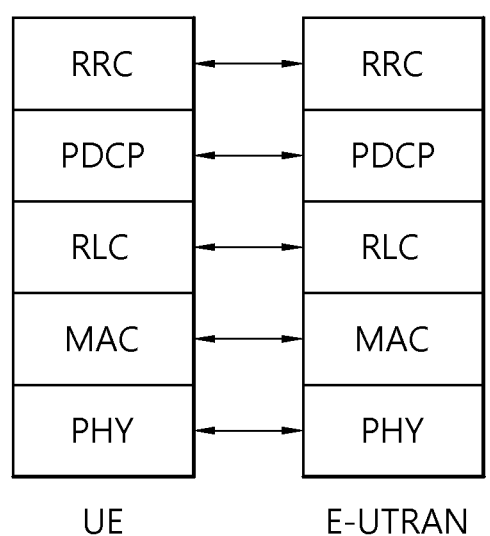
FIG. 2 is a block diagram illustrating the control plane of radio interface protocol.
Figure 3:
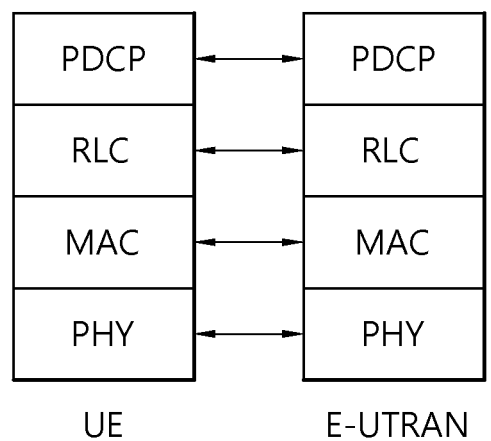
FIG. 3 is a block diagram illustrating the user plane of radio interface protocol.

In Uu interface which is a wireless section, Radio Interface Protocol is defined. This is comprised of a Physical Layer, a Data Link Layer and a Network Layer, horizontally, and comprised of a User Plane (U-plane) for transmitting user data and a Control Plane (C-plane) for transmitting control signal (Signaling), vertically. Such a Radio Interface Protocol, as shown in FIG. 2 and FIG. 3, may be distinguished by L1 (the first layer) including the PHY, the physical layer, L2 (the second layer) including the MAC/RLC/PDCP layer, and L3 (the third layer) including the RRC layer, based on the lower 3 layers of the Open System Interconnection (OSI) standard model, which is widely known in communication systems. These exist as pairs in the UE and the E-UTRAN, and are in charge of data transmission of the Uu interface.

FIG. 2 is a block diagram illustrating the control plane of radio interface protocol.

FIG. 3 is a block diagram illustrating the user plane of radio interface protocol.

Each of the layers will now be described with referring to FIG. 2 and FIG. 3.

The Physical layer (PHY), the first layer, provides Information Transfer Service to the higher layer using Physical Channel. The PHY layer is connected to the higher Medium Access Control (MAC) layer through the Transport Channel, and data are transmitted between the MAC layer and the PHY layer through the transmission channel. In this time, the transmission channel is divided into a dedicated transmission channel and a common transmission channel, largely according to whether the channel is shared. And between different PHY layers, that is, between the PHY layers at transmitter's side and receiver's side, data are transmitted through the physical layer using radio resources.

Various channels are existed in the second layer. First, the Medium Access Control (MAC) layer plays the role of mapping various Logical Channels to the various transmission channels, also plays the roles of Multiplexing logical channels which is mapping several logical channels to a transmission channel. The MAC layer is connected to the higher layer, RCL layer through Logical Channel, and the Logical Channel is largely divided into a Control Channel through which the information of the Control Plane is transmitted and a Traffic Channel through which the information of the User Plane is transmitted, according to the kind of the information which is transmitted.

The Radio Link Control (RLC) layer in the second layer plays the role of regulating the size of data in order to be adequate to transmit data to radio section via lower layer by performing segmentation and concatenation of the data received from the higher layer. In addition, in order to guarantee various QoS that each of the Radio Bearers (RBs) require, three operation modes including Transparent Mode (TM), Un-acknowledged Mode (UM) and Acknowledged Mode (AM) are provided. Particularly, the AM RLC performs the retransmission function through the Automatic Repeat and Request (ARQ) function for reliable data transmission.

The Packet Data Convergence Protocol (PDCP) layer in the second layer performs the Header Compression function for decreasing the header size of the IP packet containing relatively big and unnecessary control information in order to effectively transmit through radio section whose bandwidth is narrow when transmitting IP packet such as IPv4 and IPv6. This plays the role of increasing transmission efficiency in the radio section by transmitting only necessary information in the Header part of data. Also, in LTE system, the PDCP layer plays the role of Security, this is comprised of Ciphering that prevents monitoring of data by a third party and Integrity protection that prevents manipulation of data by a third party.

The Radio Resource Control (RRC) layer located the most upper part of the third layer is defined only on the control plane, and in charge of controlling of the logical channel, transmission channel and the physical channel in relation to the Configuration, Reconfiguration and Release of the Radio Bearers (RBs). Here, the RB means a logical path which is provided by the first and second layer of the radio protocol for data transmission between a UE and the UTRAN. Generally, configuring a RB means to the procedure of defining the characteristics of the radio protocol layer and channel which is required to provide a specific service and configuring the respective particular parameters and operation methods. The RB is divided into a Signaling RB (SRB) and a Data RB (DRB), the SRB is used for the path for transmitting the RRC message in the control plane (C-plane), and the DRB is used for the path for transmitting the user data in the user plane (U-plane).

Hereinafter, the Carrier Aggregation in LTA-A system will be described. For the convenience of description, the Carrier Aggregation will be abbreviated to CA below.

LTE-A technology standard is a candidate technology for IMT-Advanced of International Telecommunication Union (ITU), and is designed to fulfill the technological requirement of IMT-Advanced of ITU. According to this, in order to satisfy the requirements of ITU, the discussion for expanding the bandwidth in comparison with the existing LTE system has been progressed. In order to expand the bandwidth in the LTE system, a carrier that may be included in the existing LTE system is defined as a component carrier (hereinafter, it is referred to as CC). It is discussed that the maximum 5 CCs can be used up to Release-11 (Rel-11). For reference, a serving cell may be comprised of a downlink CC and an uplink CC. Or a serving cell can be comprised of a downlink CC. As CC may have the maximum 20 MHz bandwidth same as the LTE system, in case of aggregating 5 CCs, the bandwidth can be expanded to the maximum 100 MHz, and the technology that aggregates the multiple CCs is referred to as CA.

Figure 4:
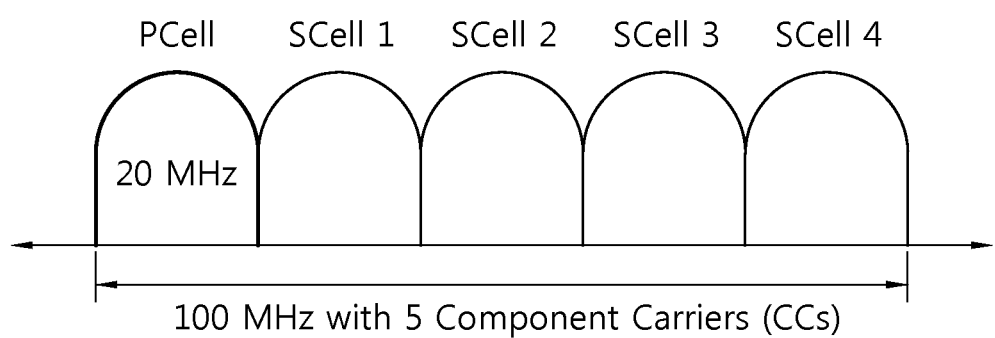
FIG. 4 illustrates the CA technology that is applicable in the LTE-A system.

FIG. 4 illustrates the CA technology that is applicable in the LTE-A system.

In case that the CA technology is applied, there exists a RRC connection between a UE and a network. Among a plurality of serving cells that are configured for a UE to use, the serving cell that provides the mobility information (e.g., TAI) of security input (e.g., ECGI, PCI and ARFCN) and Non-Access-Stratum (NAS) in order to establish and re-establish the RRC connection is referred to as a Primary Serving Cell (Pcell), and the rest of cells are referred to as Secondary Serving Cells (Scell). In the present specification, the PCell may be referred to as a primary cell, and the SCell be referred to as a secondary cell.

Figure 5:
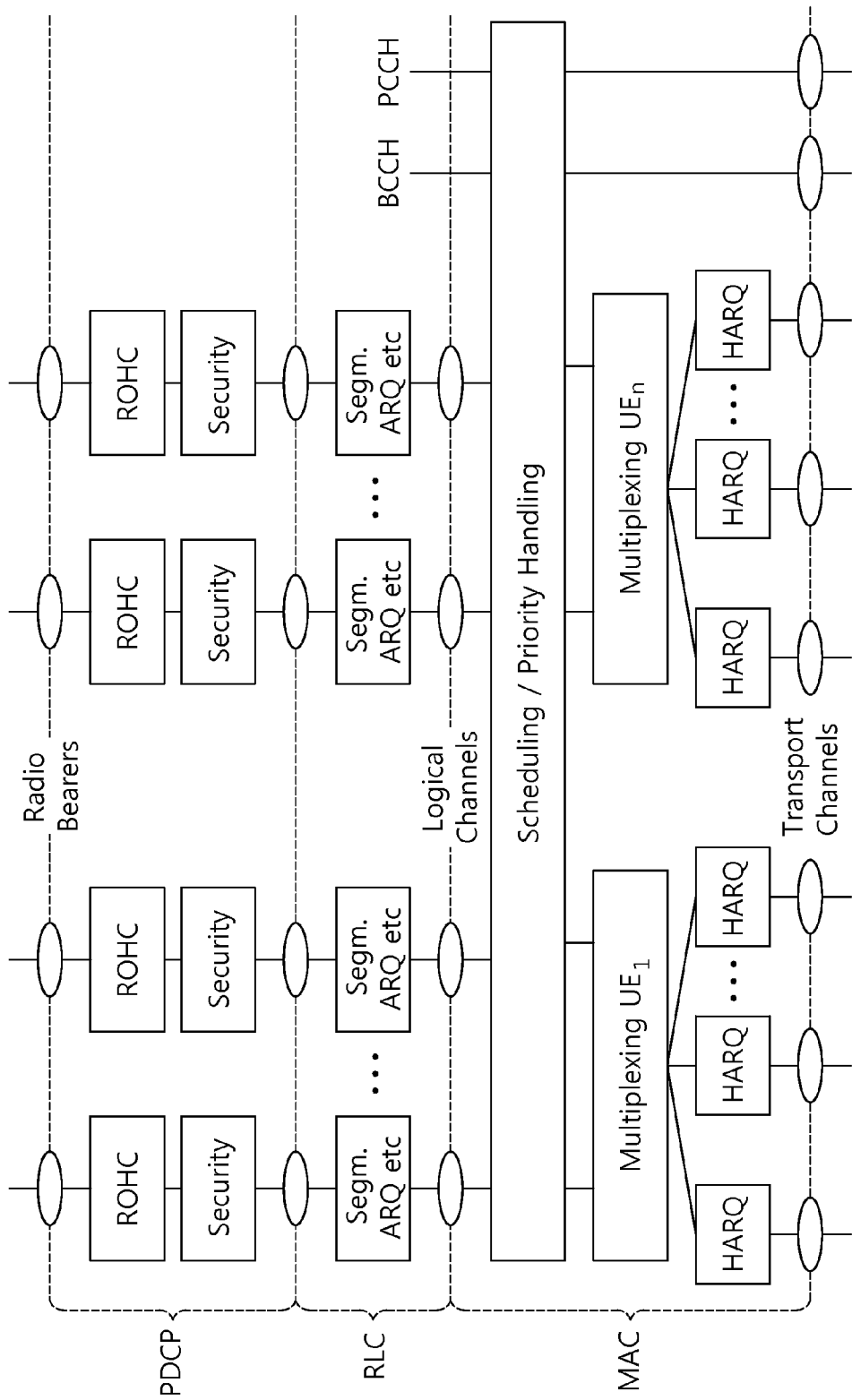
FIG. 5 illustrates the second downlink layer that is designed for consideration of the CA technology.

FIG. 5 illustrates the second downlink layer that is designed for consideration of the CA technology.

Figure 6:
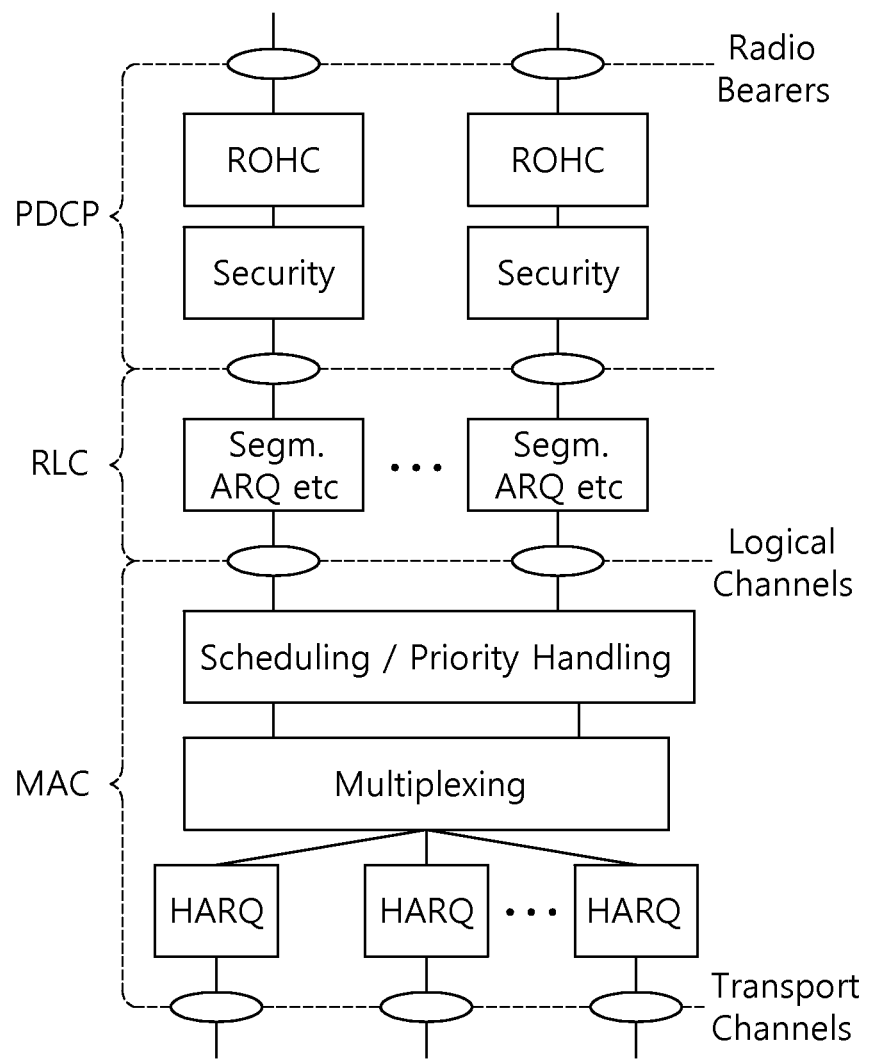
FIG. 6 illustrates the second uplink layer that is designed for consideration of the CA technology.

FIG. 6 illustrates the second uplink layer that is designed for consideration of the CA technology.

The CA technology has much effect on the MAC layer of the Layer 2. For example, as a plurality of CCs are used in CA and an individual HARQ manages a CC, operations related to the multiple HARQ individuals should be performed in the MAC layer of the LTE-A system. Additionally, as respective HARQs have a separate transport block, a plurality of transport blocks can be transmitted or received at the same time through the multiple CCs in CA.

The following is the description for Timing advance/alignment Maintenance of the uplink in the LTE system. In the LTE system which is based on the Orthogonal Frequency Division Multiplex (OFDM) technique, the time that it takes for a signal transmitted by a UE to arrive at a BS may vary according to the radius of a cell, the location of a UE in a cell, and the moving speed of a UE. That is, if the BS does not manage the uplink transmission timing for each UE, there is a possibility that the transmission signal of a UE may interfere in the transmission signal that is transmitted by another UE and the error rate of the reception signal increases in a BS.

To describe further, in case of the UE that tries transmission in the edge of the cell, the time when the signal that is transmitted like above arrives at the BS is longer than the time when the signal that is transmitted by the UE from the center of the cell arrives at the BS. On the contrary, the time when a signal that is transmitted by the UE from the center of the cell arrives at the BS is comparatively shorter than the time when a signal that is transmitted by the UE from the edge of the cell arrives at the BS. As the BS, in order to prevent the influence of interference, is supposed to have the data or signals that are transmitted by all UEs in the cell be received with each valid time boundary, the BS should properly adjust the transmission timing of the above UE according to the condition of the UE, and such an adjustment is referred to as Timing advance/alignment Maintenance.

A method for the Timing advance/alignment Maintenance may be a random access operation. That is, through the random access operation process, the BS receives the random access preamble that is transmitted by the UE and calculates the Timing advance/alignment value for advancing or retarding the transmission timing of the UE. And the Timing advance/alignment value that is calculated through the random access response is notified to the UE, and the UE updates the transmission timing using the value. As an alternative method, the BS receives the Sounding Reference Signal (SRS) that the UE transmits periodically and arbitrarily, and calculate to notify the Timing advance/alignment value of the UE through the received signal to the UE. According to this, the UE updates its transmission timing.

As described above, the BS measures the transmission timing of the UE through the random access preamble or the SRS, calculates the timing value which is to be corrected, and notifies it to the UE. As such, the Timing advance/alignment value (that is, the timing value which is to be corrected) that the BS transmits to the UE is referred to as Timing Alignment Command (TAC). The TAC is processed on the MAC layer.

And, since a UE does not always exist on a fixed position, each time the transmission timing of the UE is changed depending on the moving speed and the location of the UE. With the consideration of these things, it should be assumed that the Timing advance/alignment command is valid only for a specific time duration instead of determining that the TAC is valid for infinite times when the UE receives the Timing advance/alignment command once. What is used for this is the Time Alignment Timer (TAT).

That is, when a UE receives the TAT from a BS, the UE starts the TAT. And only for the timing that the TAT is operating, the UE assumes that the Timing advance/alignment of UL is synchronized with the BS. The value of the TAT may be transferred through the RRC signal such as the system information or the Radio Bearer Reconfiguration, and the like. Also, if the UE receives a new TAC from the BS while the TAT operates, the UE restarts the TAT. And when the TAT is terminated or the TAT is not operated, the UE assumes that the Timing advance/alignment is not synchronized with the BS, and the UE does not transmit any UL signals except the random access preamble, for example, the PUSCH and PUCCH signals.

Hereinafter, the Activation/Deactivation of the sub serving cell (that is, the secondary cell) in the CA technology will be described.

In case that a UE uses a plurality of serving cells by applying the CA technology, a BS may add or remove the sub serving cell depending on the UL/DL traffic condition of the UE. In addition, in order to optimize the signaling overhead that adds or removes the sub serving cell, the BS may control the activation state of the sub serving cell instead of removing the sub serving cell. The sub serving cell in the deactivation state may have the following characteristics.

The SRS is not transmitted from the corresponding sub serving cell.

The CQI/PMI/RI/PTI for the corresponding sub serving cell are not transmitted.

The UL data are not transmitted from the corresponding sub serving cell.

The PDCCH is not monitored in the corresponding sub serving cell.

The PDCCH for the corresponding sub serving cell is not monitored.

For these, the BS may control the activation state of a specific sub serving cell by transmitting Activation/Deactivation commands (in particular, Activation/Deactivation MAC Control Elements) that is processed on the MAC layer to the UE.

Figure 7:
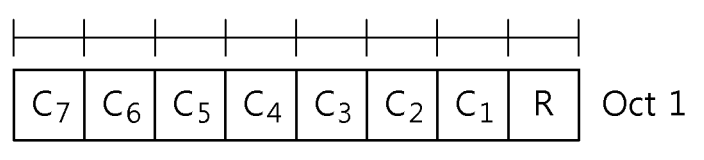

FIG. 7 is a block diagram illustrating a particular example of the Activation/Deactivation commands that control the activation state of the sub serving cell.

In case that a BS receives the Activation/Deactivation commands in order to deactivate the sub serving cell, it may happen that UE does not receive it owing to wireless errors. In preparation for this, if the sub serving cell has not been used for more than a specific time, the UE assumes that the corresponding sub serving cell is in deactivation state, not assuming that the sub serving cell maintains the activation state for infinite time. What is used for this is the sub serving cell deactivation timer (sCellDeactivationTimer).

The sub serving cell deactivation timer operates for every sub serving cell. When a UE receives the Activation/Deactivation commands, the UE starts the sub serving cell deactivation timer of the corresponding sub serving cell, and if the UE receives the Activation/Deactivation commands that activates the corresponding cell or the UL/DL resource allocation information for the sub serving cell that is activated, the UE restarts the deactivation timer. If the sub serving cell deactivation timer is terminated or the UE receives the Activation/Deactivation commands that deactivates the corresponding cell, the sub serving cell deactivation timer stops the operation and the corresponding cell is shifted to the deactivation state.

Hereinafter, the multiple timing advance in the CA technology will be described.

In case that a UE uses a plurality of serving cells by applying the CA technology, multiple Timing advance/alignment maintenances are required since respective serving cells may have different frequency characteristics. If a plurality of serving cells try to perform UL transmission without synchronizing the transmission timing, the inter-cell interference occurs. Like the case that the Timing advance/alignment is managed for each user to decrease the inter-user interference in the LTE system, the inter-cell interference is decreased by properly controlling the UL transmission timing of each serving cell having UL CC in the CA technology.

If a UE uses a plurality of serving cells, among them, there may be the serving cells having the similar characteristics of the Timing advance/alignment change depending on the frequency characteristics. For example, the serving cells in the same frequency band may have similar characteristics of the Timing advance/alignment change. In the CA technology, in order to optimize the signaling for adjusting a plurality of UL Timing advance/alignment, the serving cells having similarity in the Timing advance/alignment change are grouped, and this group is referred to as Timing Advance Group (TAG). A BS notifies the information of which TAG is each serving cell included in to a UE through the TAG identifier of the RRC signal. A UE may have at least two TAGs, and a plurality of serving cells whose UL Timing advance/alignment change is similar may exist in a TAG. At least one serving cell among the plurality of serving cells in a TAG should have UL.

As described above, if a UE receives the TAG from a BS, the UE starts the TAT, and it is assumed that the UE and the BS are synchronized only while the TAT operates. In the UE in which the CA technology is used, the Timing advance/alignment is managed for each TAG, and accordingly, the TAT operates for each TAG. That is, all of the serving cells in the same TAG apply the same Timing advance/alignment variation, and in case that the TAT is terminated, through the serving cell of the corresponding TAG, any UL transmission is not possible except the preamble for random access.

Figure 8:
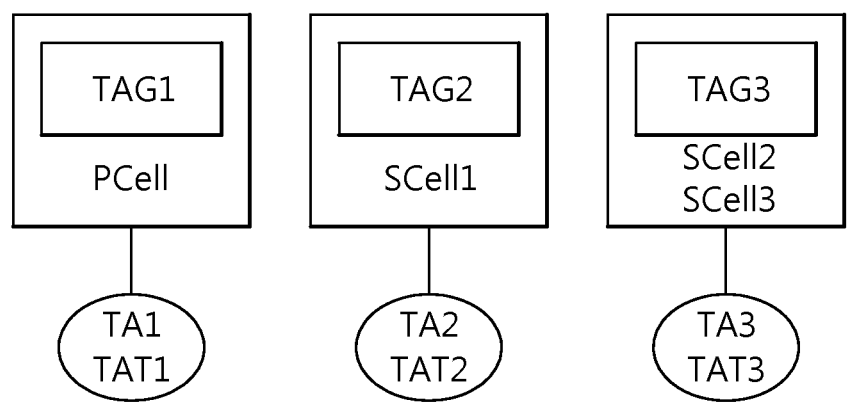
FIG. 8 illustrates an example of configuring the TAG depending on various sorts of cells.

FIG. 8 illustrates an example of configuring the TAG depending on various sorts of cells.

When adjusting UL Timing advance/alignment, the UE that uses the CA functions by configuring a plurality of serving cells may follow the principles below.

The UE may have different TAT values for each TAG.

The TAG including main serving cell is referred to as pTAG (primary TAG) and the TAG comprised of sub serving cell without main serving cell is referred to as sTAG (secondary TAG).

When the sub serving cell belonged to the sTAG initially synchronizes the Timing advance/alignment, the corresponding serving cell may start the random access process only by the command of the BS. Even if the UL transmission is required, the random access process may not be started without the command of the BS.

When the TAT of the sTAG is terminated or does not work, it is assumed that the Timing advance/alignment of the serving cells in the corresponding sTAG is not synchronized with the BS.

When the TAT of the pTAG is terminated or does not work, the TAT of the other TAG is not able to operate. That is, it is assumed that the Timing advance/alignment of all serving cells is not synchronized with the BS.

The UE selects an arbitrary cell among the serving cells which are activated in the sTAG and assumes it as the timing reference serving cell. The timing reference serving cell may be called a timing reference cell.

The timing reference cell synchronizes the UL Timing advance/alignment through random access.

When a BS newly adds a sub serving cell, that is a secondary cell to a UE, the BS considers the Timing advance/alignment variation for the secondary cell, and according to this, allocates the TAG for the corresponding secondary cell. However, since the BS is hard to accurately anticipate the Timing advance/alignment variation before the random access or the UL transmission is performed in the secondary cell, the case that the BS may not allocate proper TAG occurs. For this reason, the BS may measure the Timing advance/alignment variation by the random access being performed in the secondary cell which is newly added. As such, as a result of measuring the Timing advance/alignment variation, if it is determined that proper TAG is not allocated, a new TAG may be re-allocated.

Even in case of the secondary cell, not the Timing advance/alignment reference cell, the BS may notice there is timing drift through the UL transmission of the secondary cell. In this time, the BS let the random access be performed in the corresponding second cell, and identifies whether proper TAG is allocated.

The secondary cell that successfully completes the random access may be regarded as the Timing advance/alignment reference cell (that is, the timing reference cell) in the corresponding TAG. Accordingly, if the secondary cell which is regarded as the timing reference cell is re-allocated to the other TAG, the Timing advance/alignment variation in the previous TAG should be readjusted. That is, the BS should let the random access be performed in an arbitrary secondary cell in the previous TAG again. Such a process is not preferable in the aspect of retard occurred during the process of allocation/re-allocation of the TAG of the secondary cell. Therefore, in case that the BS is not able to accurately anticipate the Timing advance/alignment variation of the secondary cell, in order to allocate proper TAG, the mechanism is required, which makes it possible to measure the Timing advance/alignment variation of the corresponding secondary cell before allocating the TAG.

Accordingly, the present specification suggests a new type of TAG, which is distinguished from the conventional pTAG or sTAG. Hereinafter, the new type of TAG suggested by the present specification is referred to as a temporary TAG. In the temporary TAG, only the UL transmission timing, that is, the cell whose UL timing is not perceived by a network may be included. Also, in the temporary TAG, only secondary cell may be included. That is, in case of the existing TAG, only the cell determined on the UL timing is included, meanwhile, in the temporary TAG, the cells whose UL timing are not confident (for example, the secondary cell whose UL timing is not confident) are included. Whether a specific cell is included in the temporary TAG may be notified by various ways. That is, by using a TAG-ID reserved in advance (for example, TAG-ID value '3'), it may be notified to a UE that a specific cell is allocated to the temporary TAG according to the present specification. Or, by using the way that any TAG-ID is not given, it is available to notify to a UE that a specific cell is allocated to the temporary TAG according to the present invention. Distinguished from the conventional TAG, the TAT may not be operated in the temporary TAG. In addition, distinguished from the conventional TAG, the timing reference cell may not be defined or configured in the temporary TAG.

To describe in a different way, in the specification, the above described temporary TAG is configured in order to allocate the secondary cell to a UE regardless of similarity of the Timing advance/alignment variation of the secondary cell. That is, in case that the secondary cells are included in the temporary TAG, each UL Timing advance/alignment variation in the corresponding TAG may be different from each other. In case that a BS determines that it does not accurately know the Timing advance/alignment variation of a specific cell (that is, in case that the UL timing is not determined), it is suggested that the Timing advance/alignment variation is measured by allocating the temporary TAG to the corresponding cell, and a proper TAG is allocated. That is, in case that a BS allocates a priority Temporary TAG to a specific cell, a UE performs random access in the corresponding cell, and the BS measures the UL Timing advance/alignment of the cell and allocates the TAG in which the Timing advance/alignment variation of the corresponding cell is considered (the existing TAG, not the temporary TAG).

For the convenience of description, the temporary TAG may be called the first TAG, and the TAG allocated later may be called the second TAG. In this time, in case that the UL timing for the specific cell is not confident, that is, in case that the UL timing is not determined, after the corresponding cell is included in the first TAG for now, the random access process is performed for the corresponding cell, and the second TAG may be allocated to the cell by using the UL Timing advance/alignment which is measured through the random access process. That is, the first TAG may be a new type of TAG which is used in case that the UL timing is not determined, and the second TAG may be the same as the existing type which is used after the UL timing is determined.

As described above, the temporary TAG (that is, the first TAG) may be a TAG comprised of only the secondary cell. Also, the cell which is added in (that is, the first TAG), removed from, and updated of the temporary TAG may be the secondary cell.

As described above, in order to allocate the temporary TAG (that is, the first TAG) to an arbitrary serving cell, a BS may transmit the sCell configuration signal including a serving cell identifier and the TAG-ID of the temporary TAG to a UE. The TAG-ID of the temporary TAG may be setup as an arbitrary value (as described above, may be reserved by a specific value) by the BS. That is, as described above, the BS may setup the TAG-ID of the temporary TAG as '3'. Or, as described above, the BS may transmit the sCell configuration signal that does not include the TAG-ID, and notify that the temporary TAG (that is, the first TAG) is allocated to the UE.

When the UE receives the control signal for allocating the temporary TAG (for example, the sCell configuration signal) for a specific cell (for example, a specific secondary cell), the UE may perform the following operations.

When a UE receives a control signal that includes the TAG-ID (that is, the sCell configuration signal), in case that the TAG-ID is setup as an arbitrary specific value (for example, '3') that indicates the temporary TAG (that is, the first TAG), the UE determines to allocate the temporary TAG (that is, the first TAG) to the corresponding serving cell. Or, in case that a UE receives a control signal that does not include the TAG-ID (that is, the sCell configuration signal), the UE determines to allocate the temporary TAG (that is, the first TAG) which is pre-defined between the BS and the UE to the corresponding cell.

Following this, the UE allocates the temporary TAG (the first TAG) to the corresponding cell.

The UE determines that the command that shifts the corresponding cell to an activation state is received from the BS, and may shift the corresponding cell to the activation state. That is, by receiving the control signal, the UE may shift the cell to the activation state.

The UE determines that the PDCCH command that initializing the Contention-Free Random Access process for the corresponding serving cell, and may perform the Contention-Free Random Access process. That is, by receiving the control signal, the UE may perform the Contention-Free Random Access process.

Meanwhile, in order to perform the operations above, a UE may receive the sCell configuration signal or the activation command for the corresponding serving cell including the random access preamble which may be used when performing the Contention-Free Random Access process by the cell in the temporary TAG (that is, the first TAG) from a BS. That is, in case that a UE performs the Contention-Free Random Access process to measure the Timing advance/alignment variation in the serving cell in which the temporary TAG (that is, the first TAG) is allocated, the UE may perform the Contention-Free Random Access process using the random access preamble (that is, dedicated random access preamble) which is allocated to be used in the serving cell in the temporary TAG.

By performing the random access process in the corresponding serving cell by a UE, a BS may measure the Timing advance/alignment variation of the corresponding serving cell. When the UE completes the random access process, the BS may decide which TAG is allocated in the corresponding serving cell, and allocate a proper TAG (that is, the second TAG). That is, in the second TAG, only at least one cell whose UL timing is determined.

Figure 9:
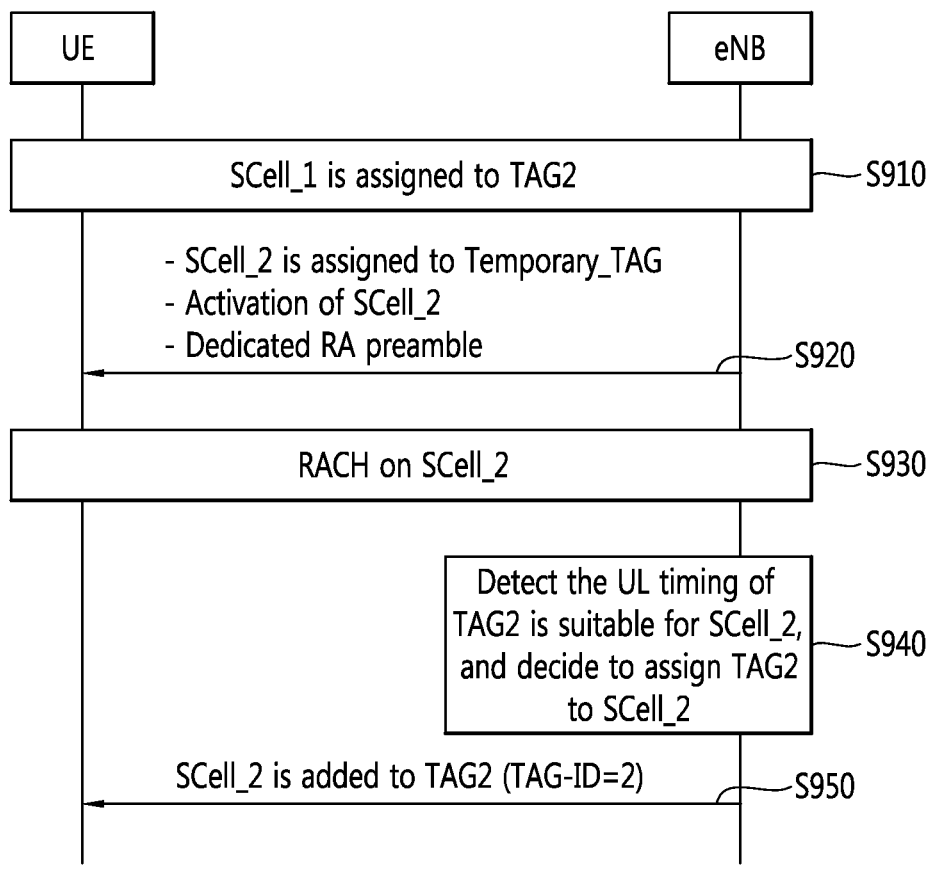
FIG. 9 illustrates an example according to the embodiment.

FIG. 9 illustrates an example according to the embodiment.

Following step, S910 depicted, it is assumed that a UE is using SCell_1, and TAG2 is allocated to the SCell_1. The TAG2 may be a TAG according to the prior art, not the temporary TAG according to the present specification.

Following step, S920 depicted, a BS includes the TAG-ID that represents the temporary TAG in order to additionally setup SCell_2 to the UE, or transmits a control signal (that is, sCell configuration signal) that does not include the TAG-ID. In this time, the control signal (that is, sCell configuration signal) may include the random access preamble which is to be used when performing Contention-Free Random Access process.

Following step, S930 depicted, when the UE receives the control signal (that is, sCell configuration signal) from a BS, the UE adds SCell_2 and allocates the temporary TAG to SCell_2 at the same time. When the temporary TAG is allocated to SCell_2, the UE may shift SCell_2 to an activation state, and perform the random access process.

Following step, S940 depicted, when performing the random access process, if the BS determines that the Timing advance/alignment variation of SCell_2 is similar to the Timing advance/alignment variation of TAG2, the BS decides that TAG2 is allocated to SCell_2.

Following step, S950 depicted, the BS may transmit the control signal (that is, sCell configuration signal) including the TAG-ID of TAG2 deciding that the Timing advance/alignment variation is similar, and allocate TAG2 to SCell_2.

Figure 10:
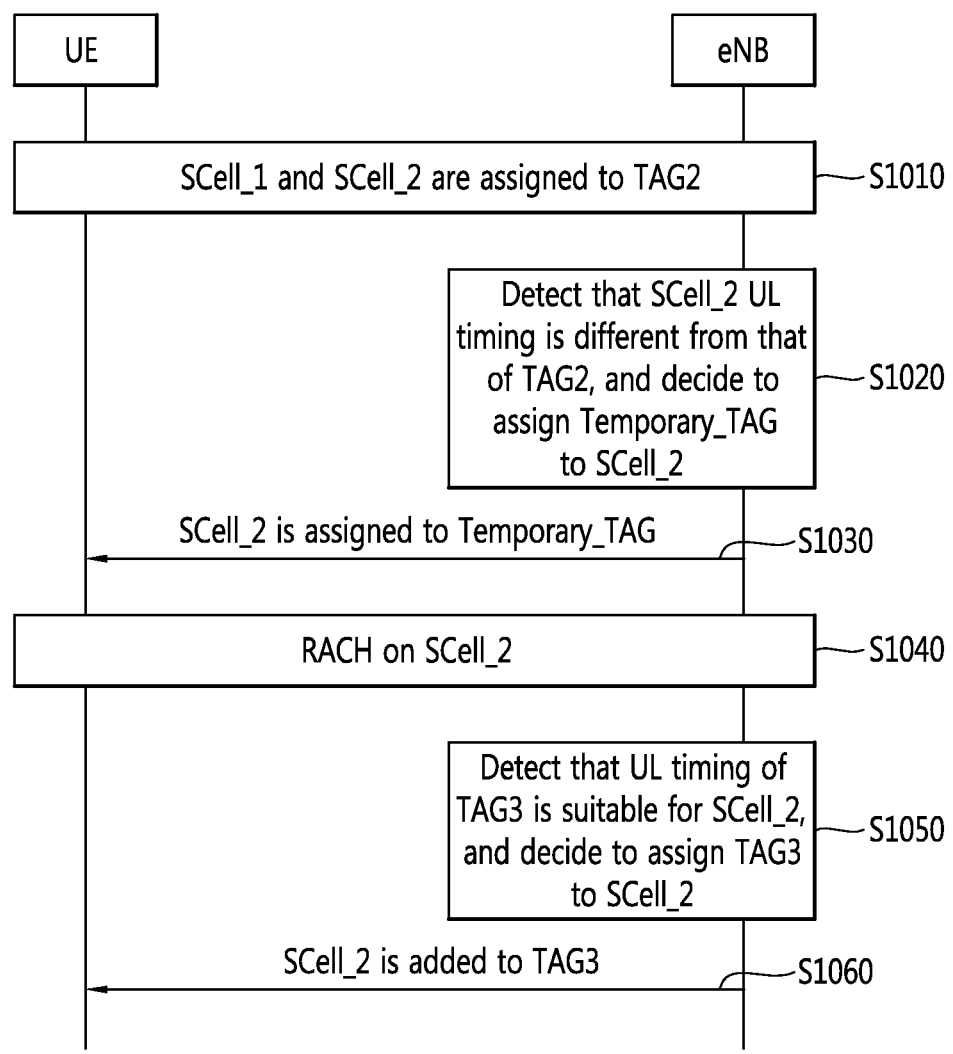
FIG. 10 illustrates another example of the operation according to the present specification.

FIG. 10 illustrates another example of the operation according to the present specification.

Following step, S1010 depicted, it may be assumed that a UE is using SCell_1 and SCell_2, TAG2 is allocated to both two serving cells. The TAG2 may be a TAG according to the prior art, not the temporary TAG according to the present specification.

Following step, S1020 depicted, a BS may determine that the UL Timing advance/alignment variation of SCell_2 in TAG2 is different from the Timing advance/alignment variation of TAG2, and decide to allocate the temporary TAG for SCell_2.

Following step, S1030 depicted, the BS may transmit the control signal that allocates SCell_2 to the temporary TAG to the UE.

Following step, S1040 depicted, the UE that receives the control signal may perform the Contention-Free Random Access in SCell_2.

Following step, S1050 depicted, during the process of performing the Contention-Free Random Access, the BS may determine that the Timing advance/alignment variation of SCell_2 is similar to the Timing advance/alignment variation of TAG3, and decide that TAG3 is allocated to SCell_2.

Following step, S1060 depicted, the BS may transmit the signal including TAG-ID that allocates TAG3 for SCell_2 to the UE.

According to the description above, in case that the BS suspects the UL Timing advance/alignment of an arbitrary secondary cell in a TAG is different, or determines that it is unable to allocate proper TAG since it is unable to accurately know the UL Timing advance/alignment of the secondary cell which is to be added, the BS allocates the temporary TAG which is available to allocate regardless of the similarity of the Timing advance/alignment for the corresponding secondary cell. In addition, by performing the Contention-Free Random Access process in the corresponding secondary cell by the UE, the BS may measure the UL Timing advance/alignment of the corresponding secondary cell and allocate proper TAG.

Figure 11:
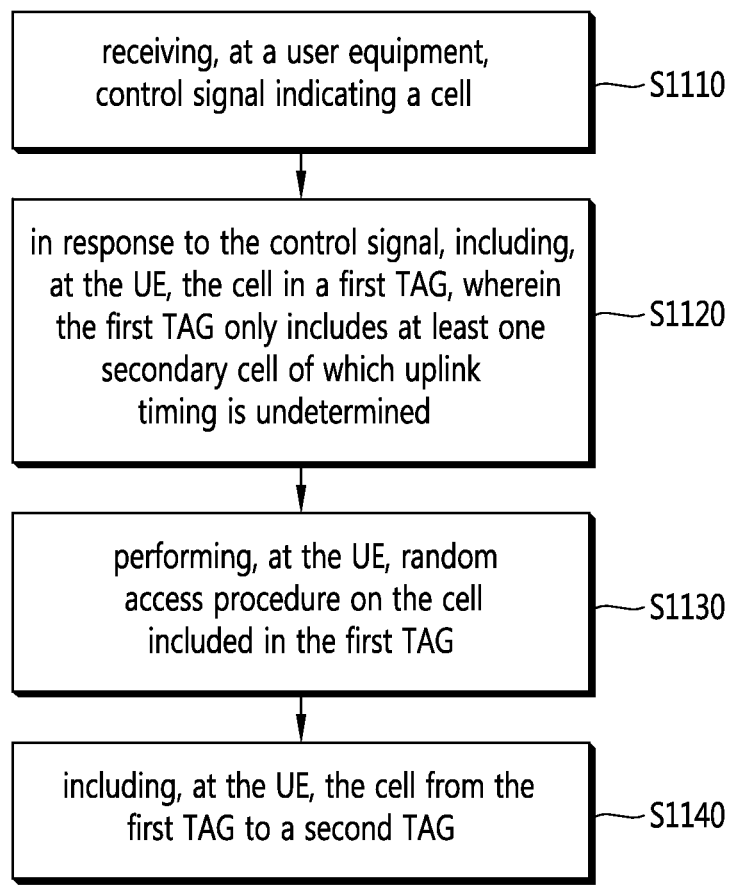
FIG. 11 illustrates a flow chart according to the present specification.

FIG. 11 illustrates a flow chart according to the present specification.

As shown in step, S1110, a user equipment (UE) may receive a control signal that indicates a cell.

After that, as shown in step, S1120, according to the control signal, the cell is included in the first TAG in the UE. However, the first TAG may include at least one secondary cell only whose UL timing is not determined.

The first TAG may be the temporary TAG that is newly suggested in the present specification. As described above, the TAT is not configured in the first TAG. The cell is preferentially allocated to the first TAG, but later may be allocated to the second TAG. The second TAG may not be a temporary TAG but the TAG that is including at least one cell only of which UL timing is determined.

In order to be showed as the first TAG, the control signal may not include the TAG-ID. Or, it may be notified that the first TAG is used in the way that the pre-determined TAG-ID is included in the control signal.

Meanwhile, the cell can be activated at the time when the cell is included in the first TAG.

After that, as shown in step, S1130, the random access procedure may be performed for the cell that is included in the first TAG in the UE. The random access procedure may be autonomously performed without a specific PDCCH command, or can be performed according to the PDCCH command. The random access procedure may be performed according to the information of the dedicated random access preamble that is included in the control signal.

And, as shown in step, S1140, the cell may include in the second TAG from the first TAG in the UE. That is, the cell is firstly allocated to the first TAG, but later it may be allocated to the second TAG. In other words, the cell may be changed from the first TAG to the second TAG.

Figure 12:
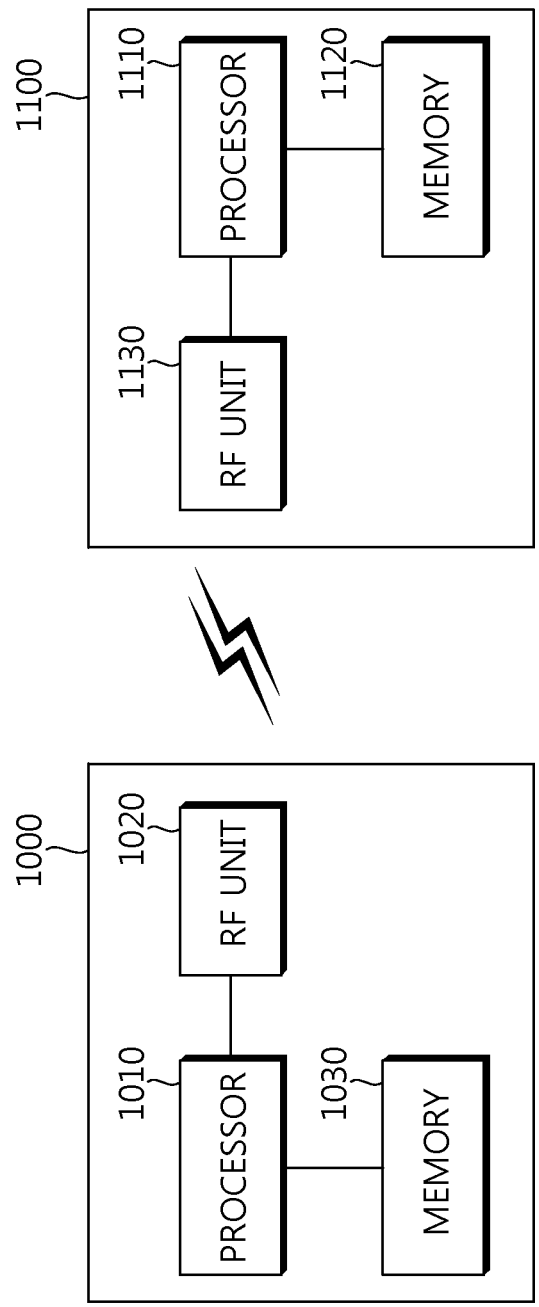
FIG. 12 is an example of a device in which the above-described technique is applied.

FIG. 12 is an example of a device in which the above-described technique is applied. The above-described technique may be implemented by a UE 1000, which is a device that transmits control information through UL. The UE 1000 may communicate with the BS 1100.

The UE 1000 includes a processor 1010, a memory 1030, and a radio frequency (RF) unit 1020. The processor 1010 may allocate radio resources according to the information provided from outside and the information stored inside beforehand. Among the embodiments described above, the process, technique and function performed by the UE may be implemented by the processor 1010. The memory 1030 is coupled to the processor 1010, and stores a variety of information for driving the processor 1010. The RF unit 1020 is coupled to the processor 1010, and transmits and/or receives a radio signal.

The BS 1100 that communicates with the UE includes a processor 1110, a memory 1120, and an RF unit 1130. Among the embodiments described above, the process, technique and function performed by the BS may be implemented by the processor 1110. The memory 1120 is coupled to the processor 1110, and stores a variety of information for driving the processor 1110. The RF unit 1130 is coupled to the processor 1110, and transmits and/or receives a radio signal.

The processors 1010 and 1110 may include an application-specific integrated circuit (ASIC), a separate chipset, a logic circuit, a data processing unit, and/or a converter for mutually converting a baseband signal and a radio signal. The memories 1030 and 220 may include a read-only memory (ROM), a random access memory (RAM), a flash memory, a memory card, a storage medium, and/or other equivalent storage devices. The RF units 1020 and 1130 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 1030 and 1120 and may be performed by the processors 1010 and 1110. The memories 1030 and 1120 may be located inside or outside the processors 1010 and 1110, and may be coupled to the processors 1010 and 1110 by using various well-known means.

The method and apparatus described above may be implemented by hardware, software or the combination thereof. For implementing with hardware, the method and apparatus may be implemented by an application-specific integrated circuit (ASIC), a digital signal processing (DSP), a programmable logic device (PLD), a field programmable gate array (FPGA), a processor, a controller, a microprocessor, other electronic unit or the combination thereof. For implementing with software, the method and apparatus may be implemented by a module that performs the function. The software may be stored in a memory unit and performed by a processor. As for the memory unit or the processor, various means well known for the skilled in the art may be adopted.

What is claimed is:

1. A method of managing a timing advance group (TAG) in a communication system, the method comprising:
    receiving, at a user equipment (UE), control signal indicating a first cell;
    in response to the control signal, including, at the UE, the first cell in a first TAG, wherein the first TAG only includes at least one secondary cell of which uplink timing is undetermined;
    performing, at the UE, random access procedure on the first cell included in the first TAG; and
    including, at the UE, the first cell from the first TAG to a second TAG.

2. The method of claim 1, wherein the first TAG is a temporary TAG.

3. The method of claim 1, wherein the second TAG is a TAG including at least one cell of which uplink timing is determined.

4. The method of claim 1, wherein the control signal does not include a TAG identifier (TAG-ID).

5. The method of claim 1, wherein the control signal includes a TAG-ID.

6. The method of claim 1, wherein the step of including the first cell to the second TAG comprises:
    changing, at the UE, a TAG of the first cell from the first TAG being a temporary TAG to the second TAG only including at least one of which uplink timing is determined.

7. The method of claim 1, wherein a time alignment timer (TAT) is not configured for the first TAG.

8. The method of claim 7, wherein the first TAG does not include a timing reference cell.

9. The method of claim 1, wherein the control signal includes information on a dedicated random access preamble.

10. The method of claim 9, wherein random access procedure is performed by using the dedicated random access preamble.

11. The method of claim 1, further comprising:
    activating the first cell when the first cell is included in the first TAG.

12. The method of claim 1, wherein the random access procedure is initiated by a physical downlink control channel (PDCCH) order received from a base station.

13. The user equipment (UE) for managing a timing advance group (TAG) in a communication system, the UE comprising:
    a transceiver configured to receive and/or transmit a signal; and
    a processor coupled to the transceiver and configured to:
    receive control signal indicating a first cell;
    in response to the control signal, include the first cell in a first TAG, wherein the first TAG only includes at least one secondary cell of which uplink timing is undetermined;
    perform random access procedure on the first cell included in the first TAG; and
    include the first cell from the first TAG to a second TAG.

* * * * *